(12) United States Patent
Talasco et al.

(10) Patent No.: US 7,845,910 B2
(45) Date of Patent: Dec. 7, 2010

(54) PROPELLER BLADE RETENTION SYSTEM WITH TAPERED ROLLER BEARING CARTRIDGE ASSEMBLIES

(75) Inventors: Eric J. Talasco, North Granby, CT (US); Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 782 days.

(21) Appl. No.: 11/758,021

(22) Filed: Jun. 5, 2007

(65) Prior Publication Data

US 2008/0304973 A1    Dec. 11, 2008

(51) Int. Cl.
*B63H 1/20* (2006.01)
(52) U.S. Cl. ........................ 416/205; 416/239
(58) Field of Classification Search .................. 416/205, 416/239
See application file for complete search history.

(56) References Cited

U.S. PATENT DOCUMENTS

| | | | |
|---|---|---|---|
| 4,850,801 A | 7/1989 | Valentine | |
| 5,022,824 A | 6/1991 | Violette et al. | |
| 5,022,825 A | 6/1991 | Violette et al. | |
| 5,035,576 A | 7/1991 | Byrnes et al. | |
| 5,102,300 A | 4/1992 | Violette et al. | |
| 5,118,256 A | 6/1992 | Violette et al. | |
| 5,269,658 A | 12/1993 | Carlson et al. | |
| 5,415,527 A * | 5/1995 | Godwin | 416/205 |
| 6,015,264 A | 1/2000 | Violette et al. | |
| 6,077,040 A | 6/2000 | Pruden et al. | |
| 6,213,719 B1 | 4/2001 | Violette et al. | |
| 6,305,905 B1 | 10/2001 | Nagle et al. | |
| 2007/0041839 A1 * | 2/2007 | Carvalho | 416/204 R |

FOREIGN PATENT DOCUMENTS

| | | |
|---|---|---|
| EP | 0822137 A3 | 3/1999 |
| FR | 2877917 | 5/2006 |
| GB | 2244525 A | 4/1991 |
| GB | 2409708 A | 6/2005 |

* cited by examiner

*Primary Examiner*—Igor Kershteyn
(74) *Attorney, Agent, or Firm*—Carlson Gaskey & Olds PC

(57) ABSTRACT

A propeller blade mounted with a preload adjacent a propeller blade root retention which increases the moment capacity of the retention for a given pitch diameter, yet permits pitching of the propeller blade about a blade axis in response to a propeller pitch change actuation system. The propeller blade retention assembly includes a tapered roller bearing set having a multiple of tapered roller bearing cartridge assemblies. Each tapered roller bearing cartridge assembly includes a retention cartridge and at least one tapered roller bearing element to facilitate installation and retention during assembly.

16 Claims, 15 Drawing Sheets

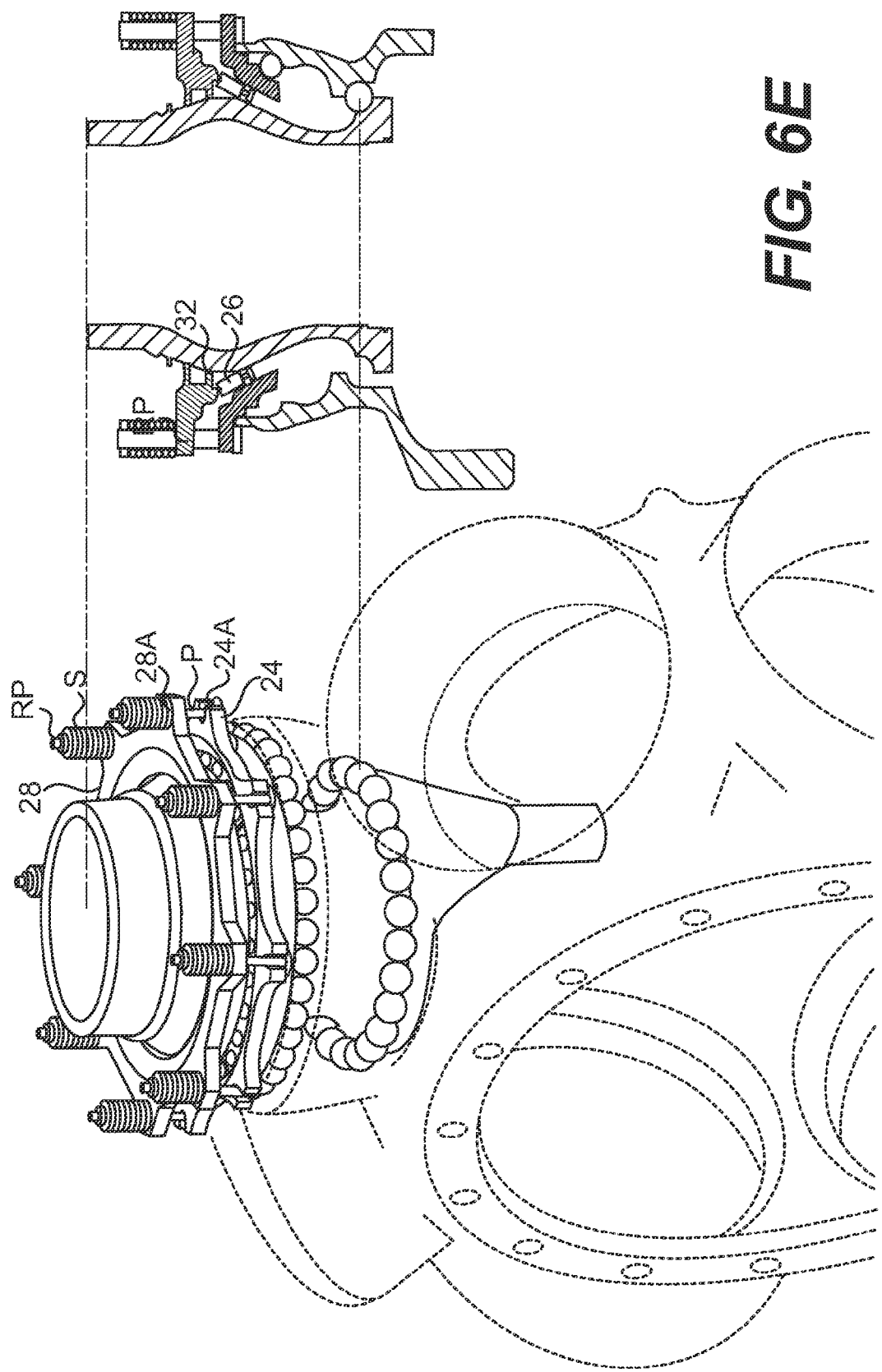

PROPELLER BLADE RETENTION SYSTEM WITH TAPERED ROLLER BEARING CARTRIDGE ASSEMBLIES

The present invention relates to a propeller blade system, and more particularly, to a tapered roller bearing cartridge and an assembly method therefore.

Aircraft propeller blade systems include propeller blades which have root portions that extend through a hub arm of a blade hub assembly. Each propeller blade is secured to and rotatable relative to the hub arm via a retention system. Typically, the retention system includes a multitude of bearing assemblies which permit the rotation of the blade within the hub arm to permit blade pitch change.

Conventional pre-loaded propeller retention systems are often preloaded by a relatively large threaded hub retention component which provides a stiff load path along the blade. Although effective, threaded attachments have the inherent limitation of introducing stress concentrations in the hub which operate under high cyclic fatigue loading. The threaded hub portions may also be difficult to monitor which may complicate retention of the initial preload over prolonged periods of service time. In addition, special tools are often required to apply the relatively high preload necessary to the relatively large hub components. This may increase maintenance complexity.

Conventional pre-loaded propeller retention systems typically require the relatively complicated installation and retention of a multiple of preloaded tapered roller bearing elements. The tapered roller bearing elements must move together during the preloading process as the final installed diameter, relative to the pitch change axis, is smaller in the installed position than in the assembly position. This precludes the use of a conventional tapered roller bearing cage which is manufactured to a fixed diameter to trap the upper and lower surface of the roller bearings. A multiple of individual tapered roller bearing elements are thus individually installed. Although effective, such installation and assembly may be quite tedious and time consuming.

Accordingly, it is desirable to provide a propeller blade retention assembly which facilities the installation and retention of a multiple of preloaded tapered roller bearings to increase the moment capacity of the retention system for a given pitch diameter, yet yields a reduction in maintenance complexity.

SUMMARY OF THE INVENTION

A propeller blade retention assembly according to the present invention applies a preload to a propeller blade root generally along a blade axis which increases the moment capacity of the retention for a given pitch diameter. The propeller blade retention assembly is supported within a hub arm by an inner retention ball bearing set, an outboard retention ball bearing set and a tapered roller bearing set. The tapered roller bearing set runs between a floating race and a propeller blade root as maintained by an end cap which is fastened to the floating race. The preload condition is generated by the tapered roller bearing set which pushes the propeller blade root outboard along the blade axis and the floating race inboard along the blade axis. The preload provides relatively stiff blade retention, yet permits pitch change of the propeller blade about the blade axis.

The tapered roller bearing set includes a multiple of tapered roller bearing cartridge assemblies each having a retention cartridge and at least one tapered roller bearing element. The retention cartridge includes a retention feature that engages each tapered roller bearing element such that each tapered roller bearing element essentially "snaps" in and out of the retention cartridge to facilitate maintenance and assembly.

The present invention therefore provides a propeller blade retention assembly which facilities the installation and retention of a multiple of preloaded tapered roller bearings to increase the moment capacity of the retention system for a given pitch diameter, yet yields a reduction in maintenance complexity.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6E is a perspective view illustrating a step of the assembly method of FIG. 5;

DETAILED DESCRIPTION OF THE PREFERRED EMBODIMENT

Figure 1A:
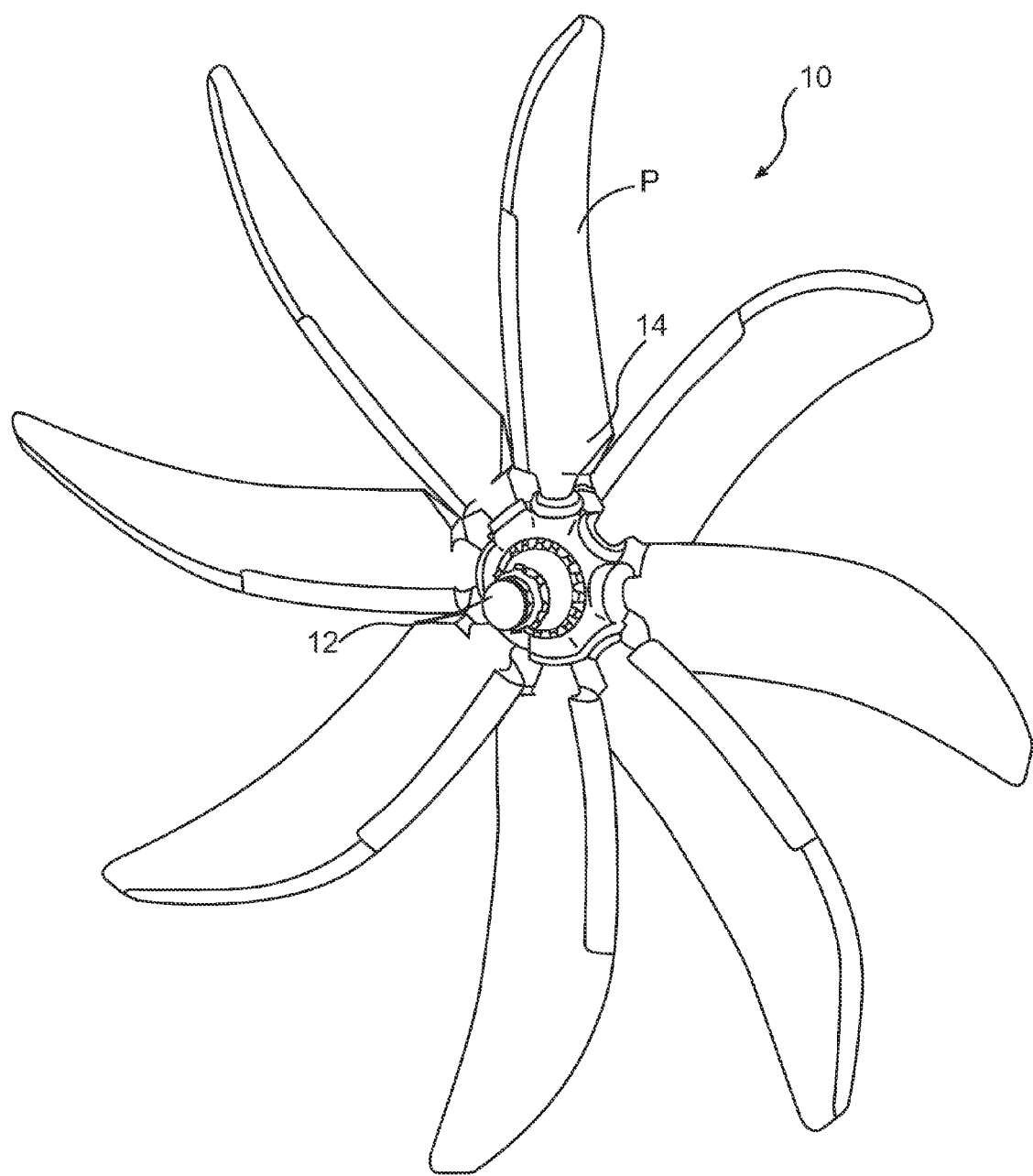
FIG. 1A is a general perspective front view of a propeller system.

FIG. 1A illustrates a general perspective view of a propeller system 10. The propeller system 10 includes a hub assembly 12 which supports a multiple of pre-loaded propeller blade retention assemblies 14 which retain a propeller blade P. It should be understood that although a propeller blade retention system typical of a turboprop aircraft is illustrated in the disclosed embodiment, various rigid prop/rotor blade systems including tilt rotor and tilt wing systems which requires a pre-load retention will benefit from the present invention.

Figure 1B:
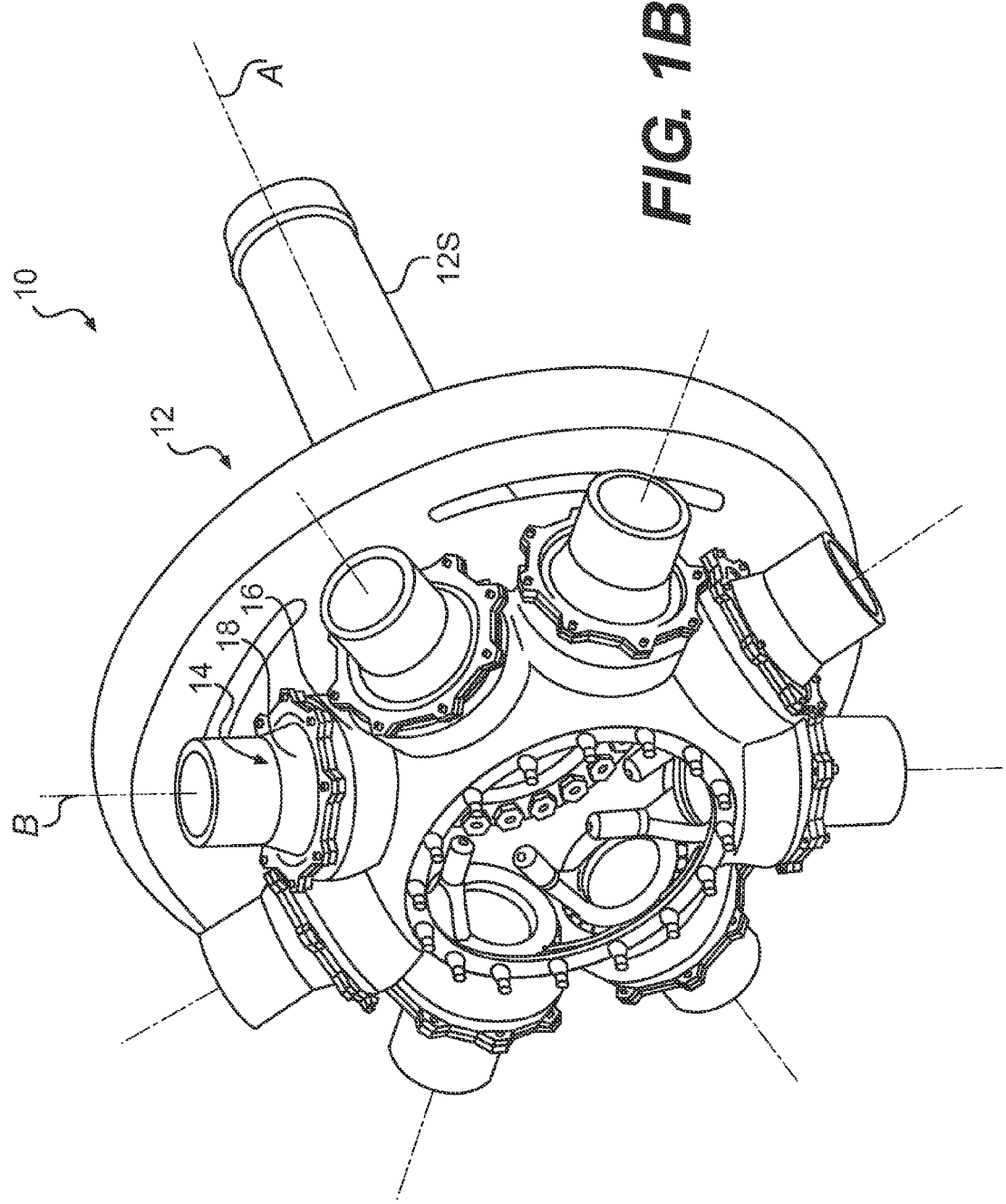
FIG. 1B is a general perspective front view of a propeller blade retention system.

Referring to FIG. 1B, the hub assembly 12 includes a multiple of hub arms 16. Each hub arm 16 is the primary structural support for each propeller blade retention assembly 14. The multiple of hub arms 16 may be formed integrally into a single, one-piece hub which, in addition to providing a mounting location for the blades P, may also house the propeller pitch control system. It should be understood that various hub constructions will be usable with the present invention.

The hub assembly 12 is mounted to a propeller drive shaft 12S which extends transversely therefrom such that the propeller system 10 may be driven about an axis of rotation A. Each propeller blade retention assembly 14 defines a blade axis B transverse to the axis of rotation A.

Figure 2:
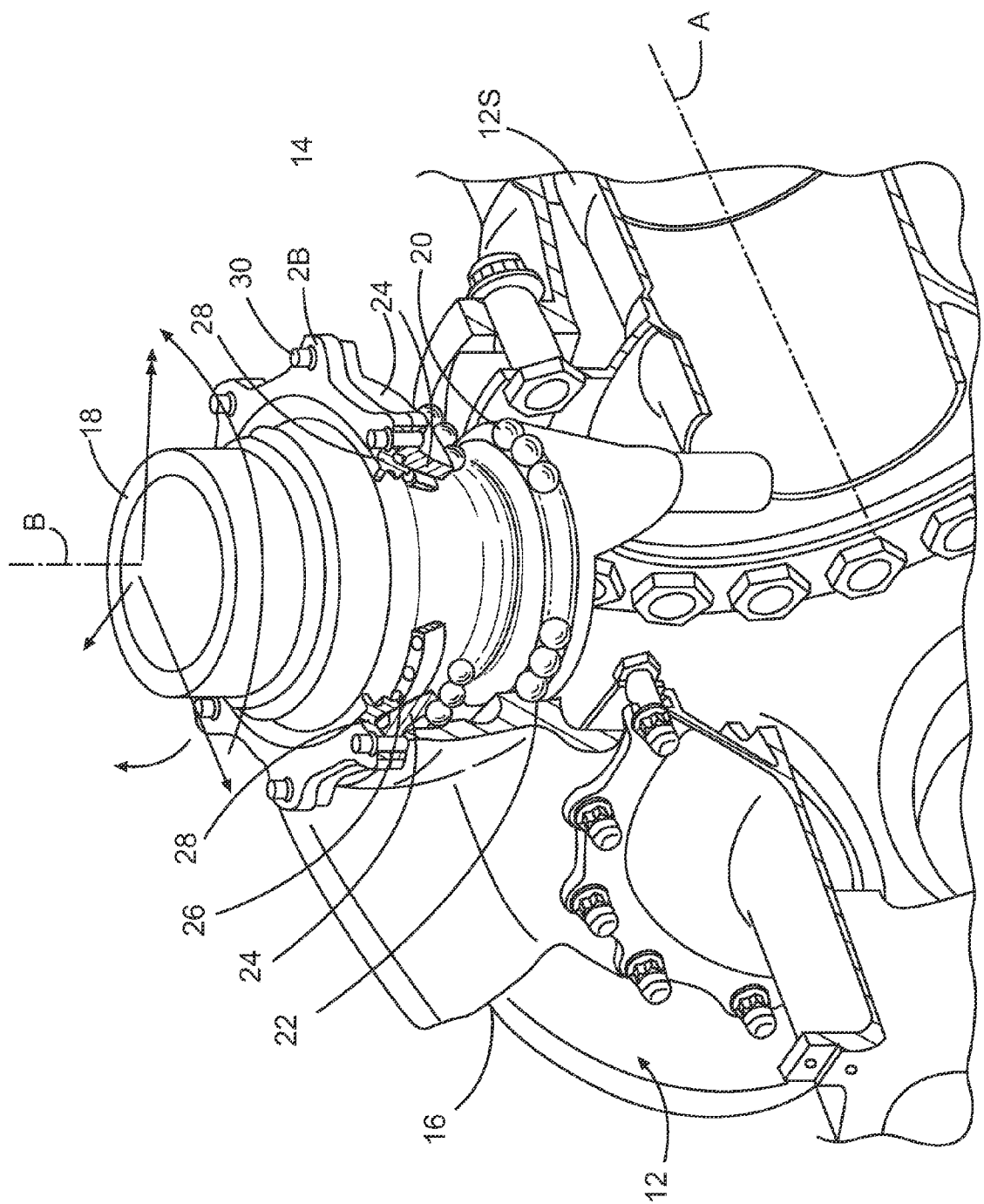
FIG. 2 is a partial sectional view of the propeller blade retention system.
Figure 3:
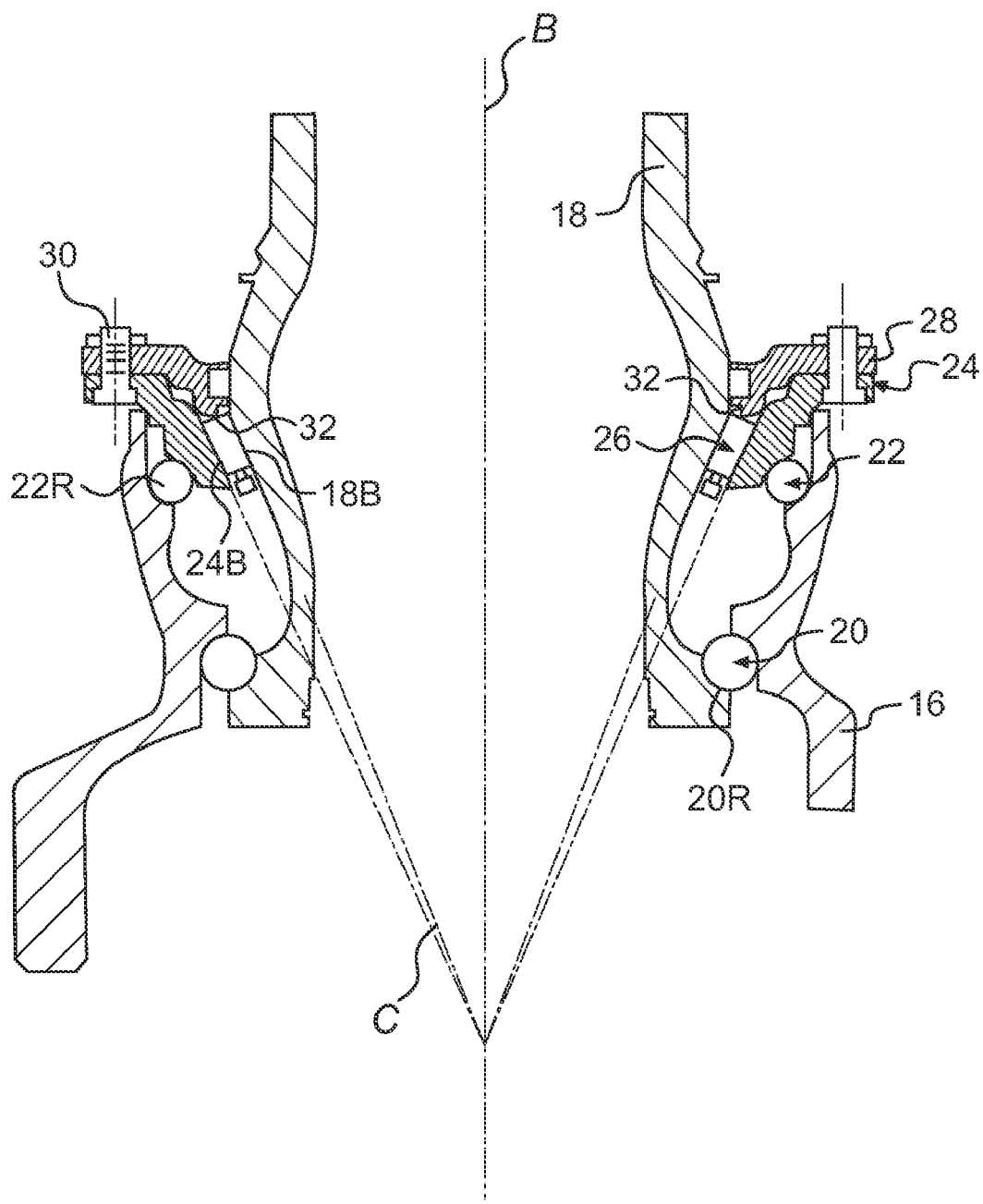
FIG. 3 is a sectional view of a propeller blade retention assembly.

Referring to FIG. 2, each propeller blade retention assembly 14 includes a propeller blade root 18, an inner retention ball bearing set 20, an outboard retention ball bearing set 22, a floating race 24, a tapered roller bearing set 26, and an end cap 28 (also illustrated in FIG. 3). Notably, each propeller blade retention assembly 14 is essentially identical, such that only a single propeller blade retention assembly 14 need be specifically described herein.

The propeller blade retention assembly 14 applies a preload to the propeller blade root 18 generally along the blade axis B which increases the moment capacity of the retention for a given pitch diameter, yet permits pitching of the propeller blade root 18 about the blade axis B in response to a propeller pitch change actuation system which interacts with a blade pitch pin 18p. It should be understood that the propeller blade root 18 as illustrated may be a section of a complete propeller blade, or a retention portion which receives a removable airfoil portion of a propeller blade.

Referring to FIG. 3, the propeller blade retention assembly 14 is supported within the hub arm 16 by the inner retention ball bearing set 20, the outboard retention ball bearing set 22 and the tapered roller bearing set 26 which extend about a perimeter of the propeller blade root 18. An inner pitch diameter is defined by the inner retention ball bearing set 20 which runs in an inboard race 20R defined between the hub arm 16 and the propeller blade root 18. An outer pitch diameter is defined by the outboard retention ball bearing set 22 which runs in an outboard race 22R defined between the hub arm 16 and the floating race 24.

The tapered roller bearing set 26 runs between the floating race 24 and the propeller blade root 18 as maintained by the end cap 28 which is fastened to the floating race 24 through a multitude of threaded fasteners 30 (also illustrated in FIG. 2) such as a bolt or the like. The threaded fastener 30 is located generally parallel to the blade axis B to maintain the end cap 28 and the floating race 24 in facial engagement such that an end cap nose 32 contacts the tapered roller bearing set 26. Notably, the end cap 28 is in facial engagement with the floating race 24—not threaded thereto—such that stress concentrations are minimized and the threaded fasteners 30 provide multiple redundant load paths. The end cap nose 32 positions the tapered roller bearing set 26 between the end cap 28 and the floating race 24 to provide the preload condition.

Each tapered roller bearing 44 of the tapered roller bearing set 26 defines a cone angle C which intersects the blade axis B. The tapered roller bearing set 26 runs between a floating race bearing surface 24B of the floating race 24 and a propeller blade root bearing surface 18B of the propeller blade root 18. The floating race bearing surface 24B and the propeller blade root bearing surface 18B are also defined along a cone angle such that the floating race bearing surface 24B is an inner surface which faces toward the blade axis B and the propeller blade root bearing surface 18B is an outer surface which faces away from the blade axis B. In other words, a frustro-conical interface is formed about the blade axis B to receive the tapered roller bearing set 26.

The preload condition is generated by the tapered roller bearing set 26 which pushes the propeller blade root 18 outboard along the blade axis B and the floating race 24 inboard along the blade axis B. The tapered roller bearing set 26 provides potentially lower rolling element friction than the outboard retention ball bearing set 22 in which pitch change results in rotation at the inner retention ball bearing set 20 and the tapered roller bearing set 26 during pitch change. The outboard retention ball bearing set 22 has a potentially higher friction and need not rotate. The outboard retention ball bearing set 22 also provides a softer preloaded joint allowing for wear without loss of preload. The preload provides relatively stiff blade retention, yet permits pitching of the propeller blade root 18 about the blade axis B by allowing rotation at 22.

One or more seals (not shown) may be located between the propeller blade root 18 and the end cap; the end cap 28 and the floating race 24; and the floating race 24 and the hub arm 16. It should be understood that various seal arrangements may be utilized with the present invention.

Figure 4A:
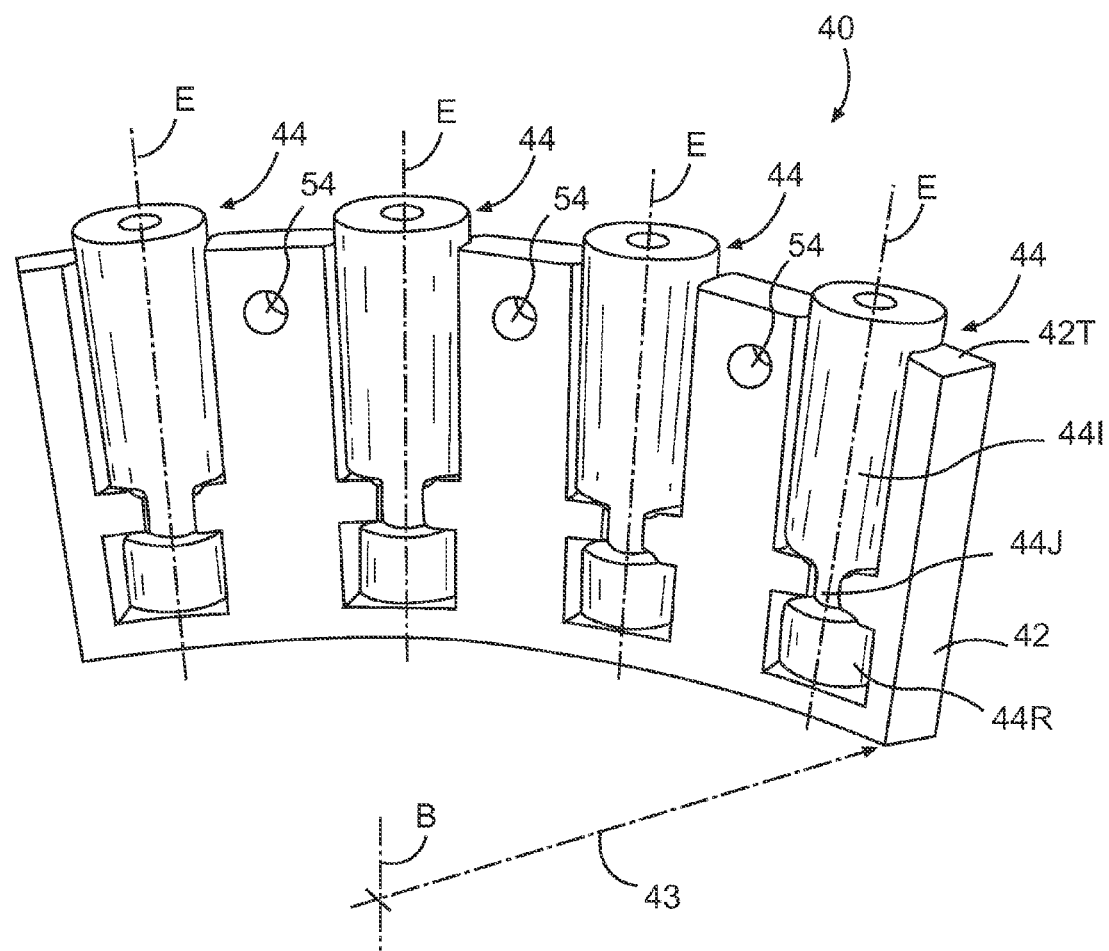
FIG. 4A is a perspective view of one tapered roller bearing cartridge assembly.

Referring to FIG. 4A, the tapered roller bearing set 26 includes a multiple of tapered roller bearing cartridge assemblies 40 (one shown) each having a retention cartridge 42 and at least one tapered roller bearing element 44 (four shown). The retention cartridge 42 defines a radius 43 for receipt between the propeller blade root 18 and the floating race 24 about the axis B. The retention cartridge 42 retains each of the multiple of tapered roller bearing elements 44 within a roller bearing element slot 48 along a tapered roller bearing element axis E (FIG. 4B).

The disclosed embodiment of the tapered roller bearing set 26 has four tapered roller bearing elements 44 per retention cartridge 42 with a total of seven (7) cartridges per propeller blade. It should be understood that any number of cartridges may be utilized with the least number of cartridges possible being two, however, assembly considerations may dictate the number of cartridges based on the size of the initial gap between the multiple of tapered roller bearing cartridge assemblies 40 relative to the desired preload.

Figure 4B:
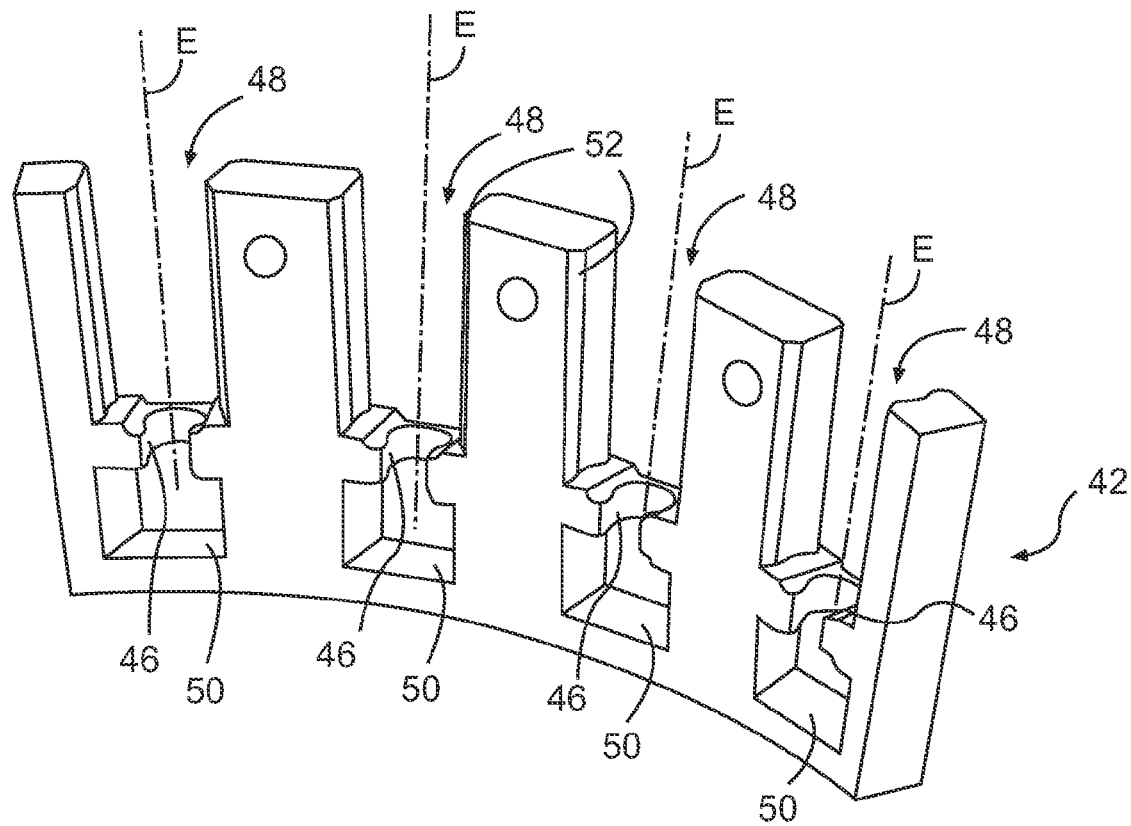
FIG. 4B is a perspective view of a retention cartridge of the tapered roller bearing cartridge assembly.
Figure 4C:
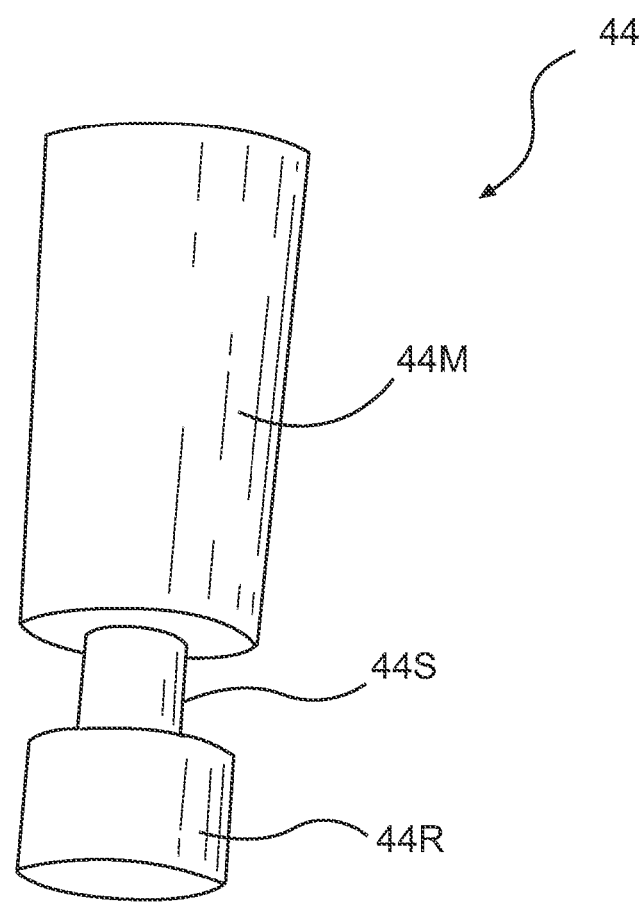
FIG. 4C is a perspective view of a tapered roller bearing element of the tapered roller bearing cartridge assembly.

Each tapered roller bearing element 44 includes a bearing element main body section 44M, a reduced diameter bearing element section 44R, and a bearing element shaft section 44S there between (FIG. 4C).

The retention cartridge 42 retains each of the multiple of tapered roller bearing elements 44 within the roller bearing element slot 48 along the tapered roller bearing element axis E through a retention feature 46 (FIG. 4B). The retention feature 46 engages the bearing element shaft section 44S (FIG. 4C) of each tapered roller bearing elements 44 such that each tapered roller bearing element 44 essentially "snaps" in and out of the retention cartridge 42. A lip of the retention feature 46 defines a distance less than the diameter of the bearing element shaft section 44S such that the flexibility thereof permits the bearing element shaft section 44S to pass the interference fit created thereby. The "snap" feature allows the individual tapered roller bearing elements 44 to be assembled/disassembled from the cartridge 42 to provide the tapered roller bearing cartridge assemblies 40. This facilitates maintenance and replacement of the tapered roller bearing cartridge assemblies 40 and individual tapered roller bearing element 44 as required.

Figure 6A:
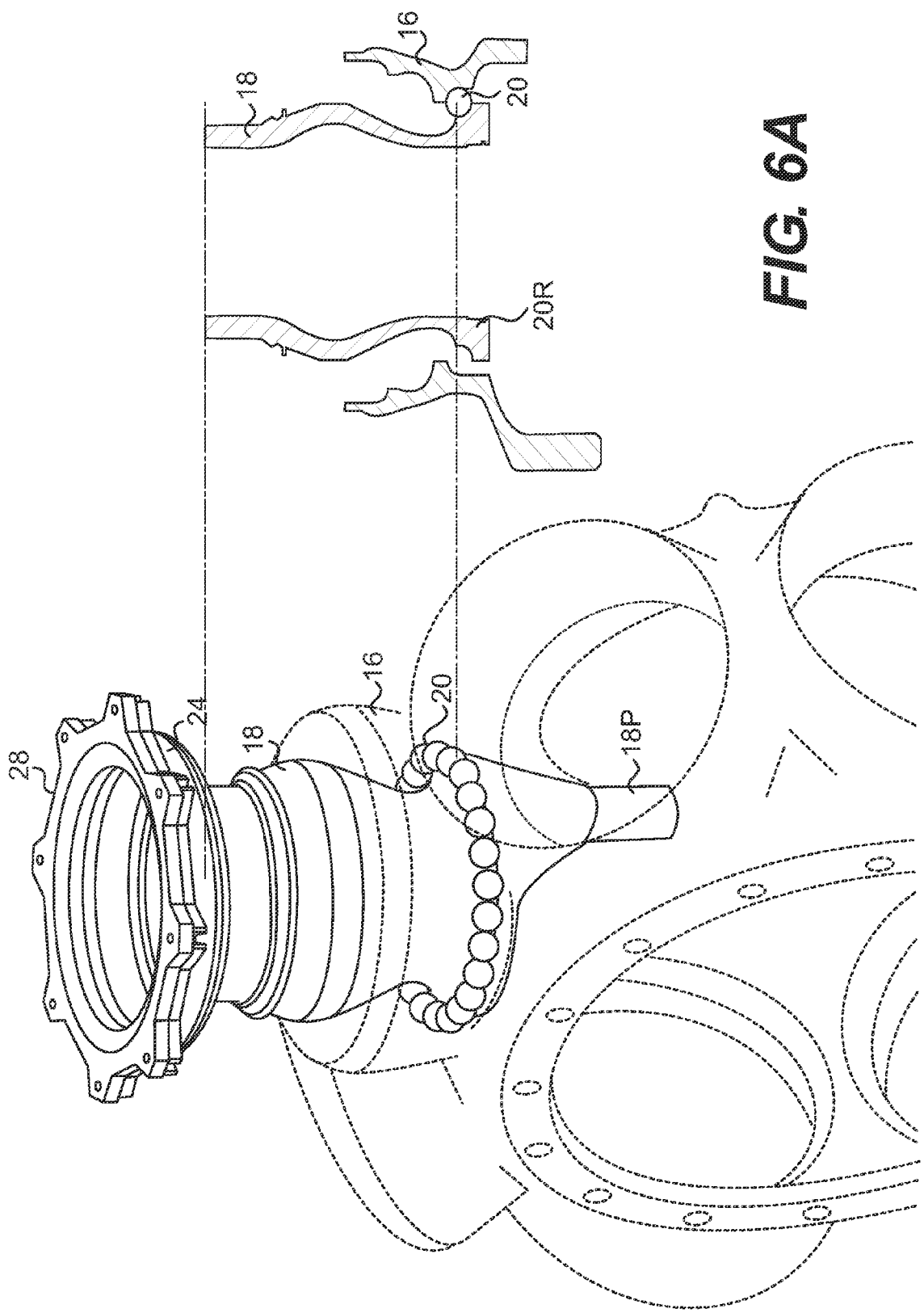
FIG. 6A is a perspective view illustrating a step of the assembly method of FIG. 5.

The retention cartridge 42 is manufactured of a low friction material such as a non-metallic material to reduce the torque required to rotate the blade. The material is also flexible to accommodate the "snap" feature which allows the individual tapered roller bearing elements 44 to be assembled/disassembled from the cartridge 42. The retention feature 46 bridges each roller bearing element slot 48 in the disclosed embodiment. A floor 50 also bridges each roller bearing element slot 48 to further maintain the integrity of the retention cartridge 42. The top of each tapered roller bearing element 44, is exposed and above a top section 42T of the retention cartridge 42 to facilitate pressing of the tapered roller bearing cartridge assemblies 40 into place (FIGS. 6D-6F).

Relatively significant break edges 52 (FIG. 4B) are defined along each longitudinal edge of the roller bearing element slot 48 to reduce surface contact and thus friction between the tapered roller bearing element 44 and the roller and the retention cartridge 42. The retention cartridge 42 further provides a significant clearance fit between the reduced diameter bearing element section 44R and the retention cartridge 42 as well as between the bearing element shaft section 44s and the retention cartridge 42. This minimizes friction by eliminating all contact between the reduced diameter bearing element section 44R and the bearing element shaft section 44s with the retention cartridge 42 in their respective areas. The diameter of the reduced diameter bearing element section 44R is reduced relative the cone angle of the bearing element main body 44M. This ensures that the reduced diameter bearing element section 44R does not receive any of the bearing loads which could produce high contact stress levels through contact with the propeller blade root 18 or the floating race 24. Essentially, the reduced diameter bearing element section 44R only retains the axial position of the bearing element shaft section 44S within the reduced diameter retention feature 46 of the retention cartridge 42.

The retention cartridge 42 may alternatively or additionally include extraction features 54 (FIG. 4A) such as openings which facilitate extraction of the of tapered roller bearing cartridge assemblies 40 from between the between the floating race 24 and the propeller blade root 18. The extraction feature 54 is shaped for receipt of an associated tool.

Figure 5:
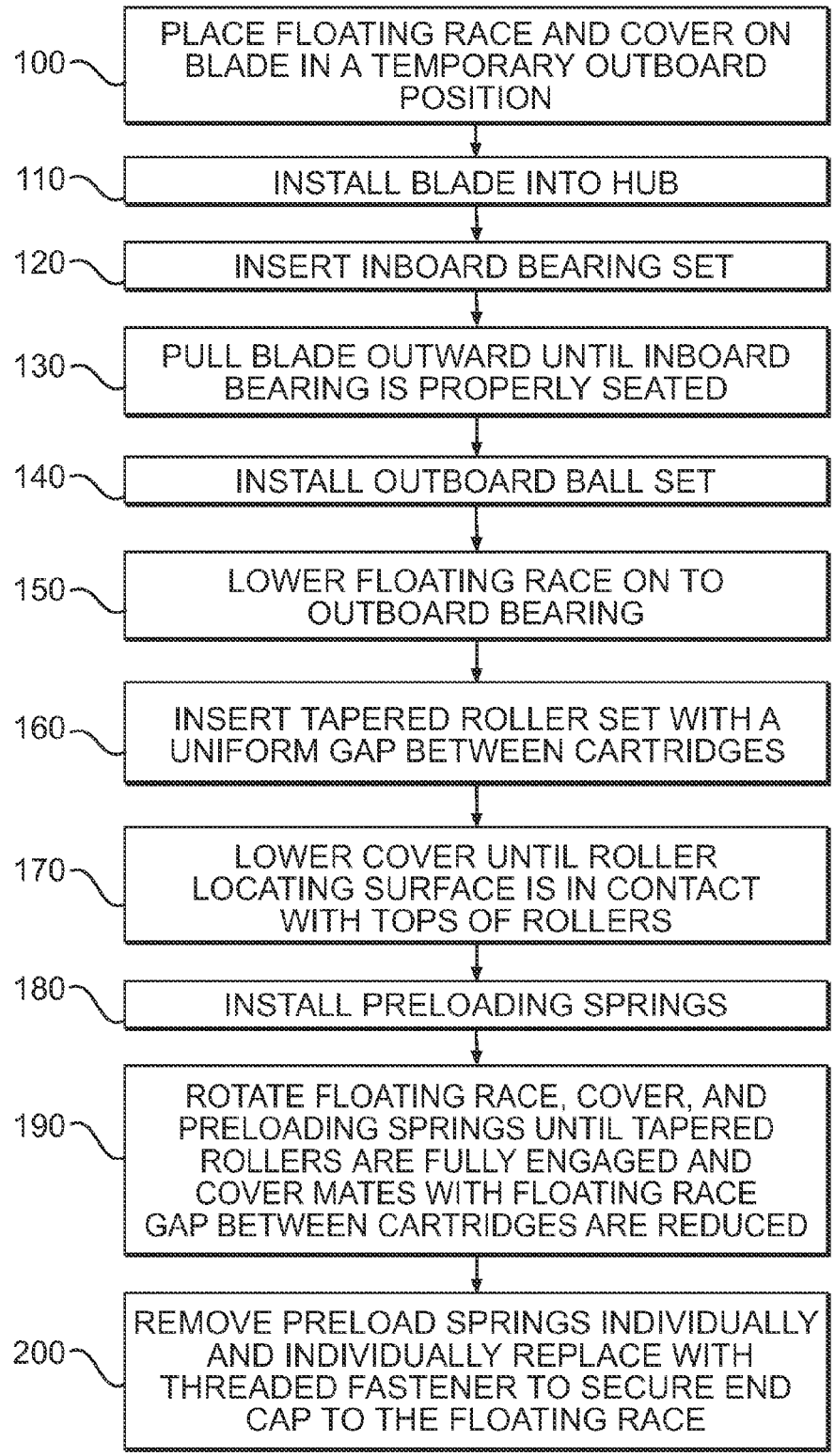
FIG. 5 is a flow chart which illustrates an assembly method to the propeller blade retention system.

Referring to FIG. 5, the preload condition is produced in an uncomplicated manner which facilitates routine maintenance and repair in a field environment. In step 100, the floating race 24 and the end cap 28 are located over the propeller blade root 18 in a temporary outboard position away from the hub arm 16 (FIG. 6A). In step 110, the propeller blade root 18 is installed into the hub arm 16. In step 120, the inboard retaining ball bearing set 20 is located within the inboard race 20R between the propeller blade root 18 and the hub arm 16. In step 130, the propeller blade root 18 is partially retracted outboard relative the hub arm 16 such that the inboard retaining ball bearing set 20 seated within the inboard race 20R.

Figure 6B:
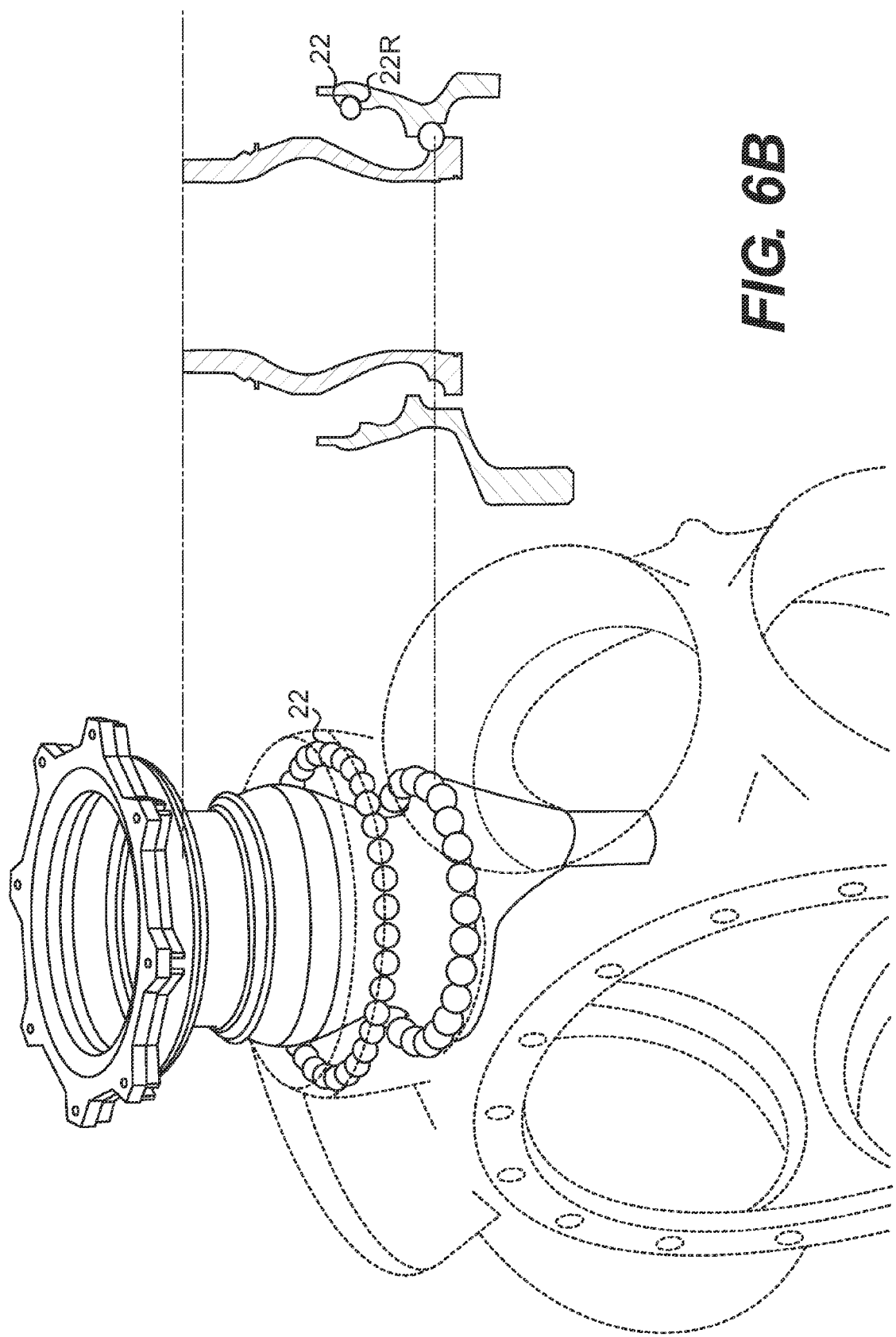
FIG. 6B is a perspective view illustrating a step of the assembly method of FIG. 5.

In step 140, the outboard retention ball bearing set 22 is located within a portion of the outer race 22R defined by the hub arm 16 (FIG. 6B). The outboard retention ball bearing set 22 permits the floating race 24 to be rotated for assembly purposes otherwise the propeller blade root 18 would have to be rotated which may not be possible as the airfoils of adjacent propeller blades may touch.

Figure 6C:
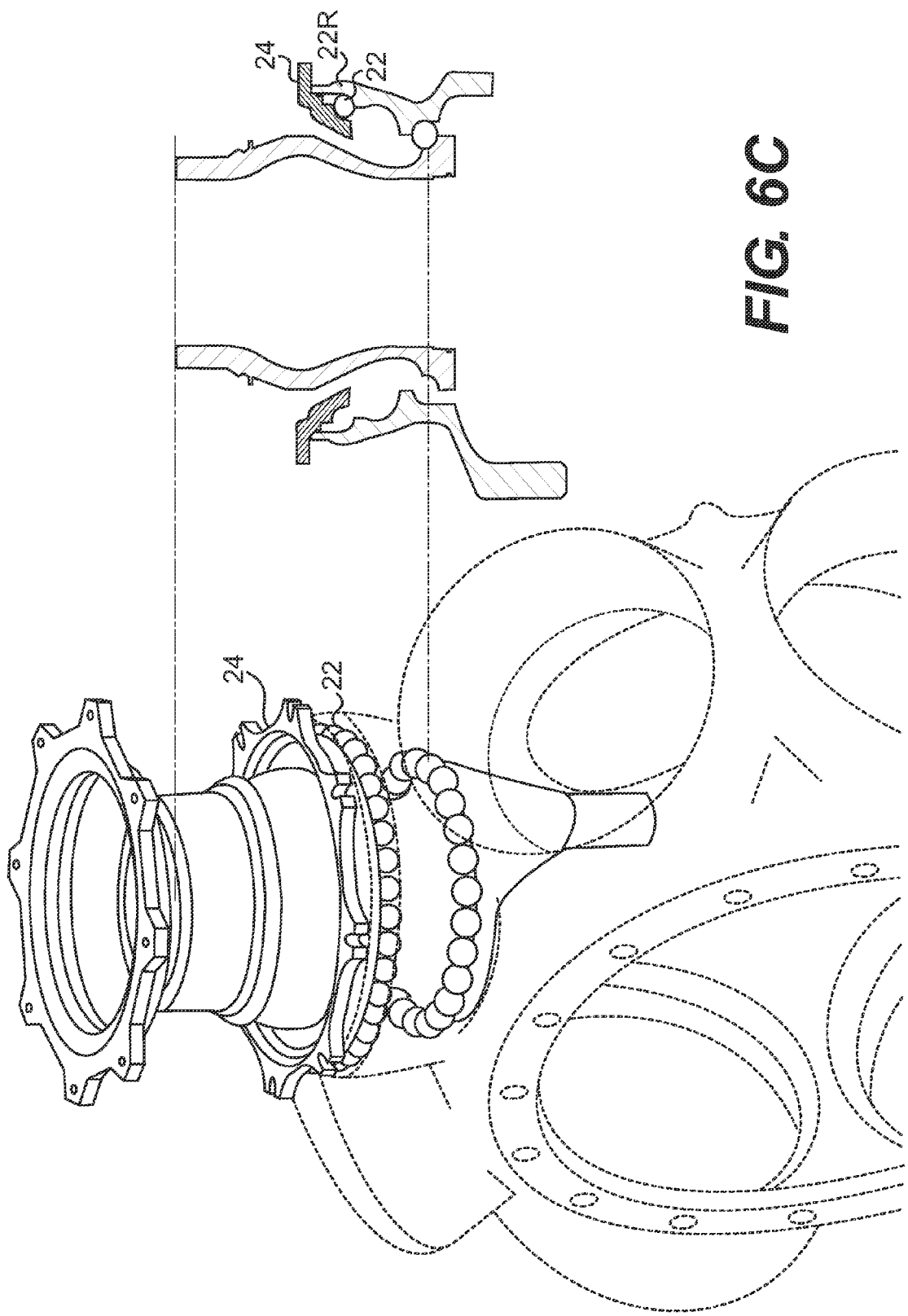
FIG. 6C is a perspective view illustrating a step of the assembly method of FIG. 5.
Figure 6D:
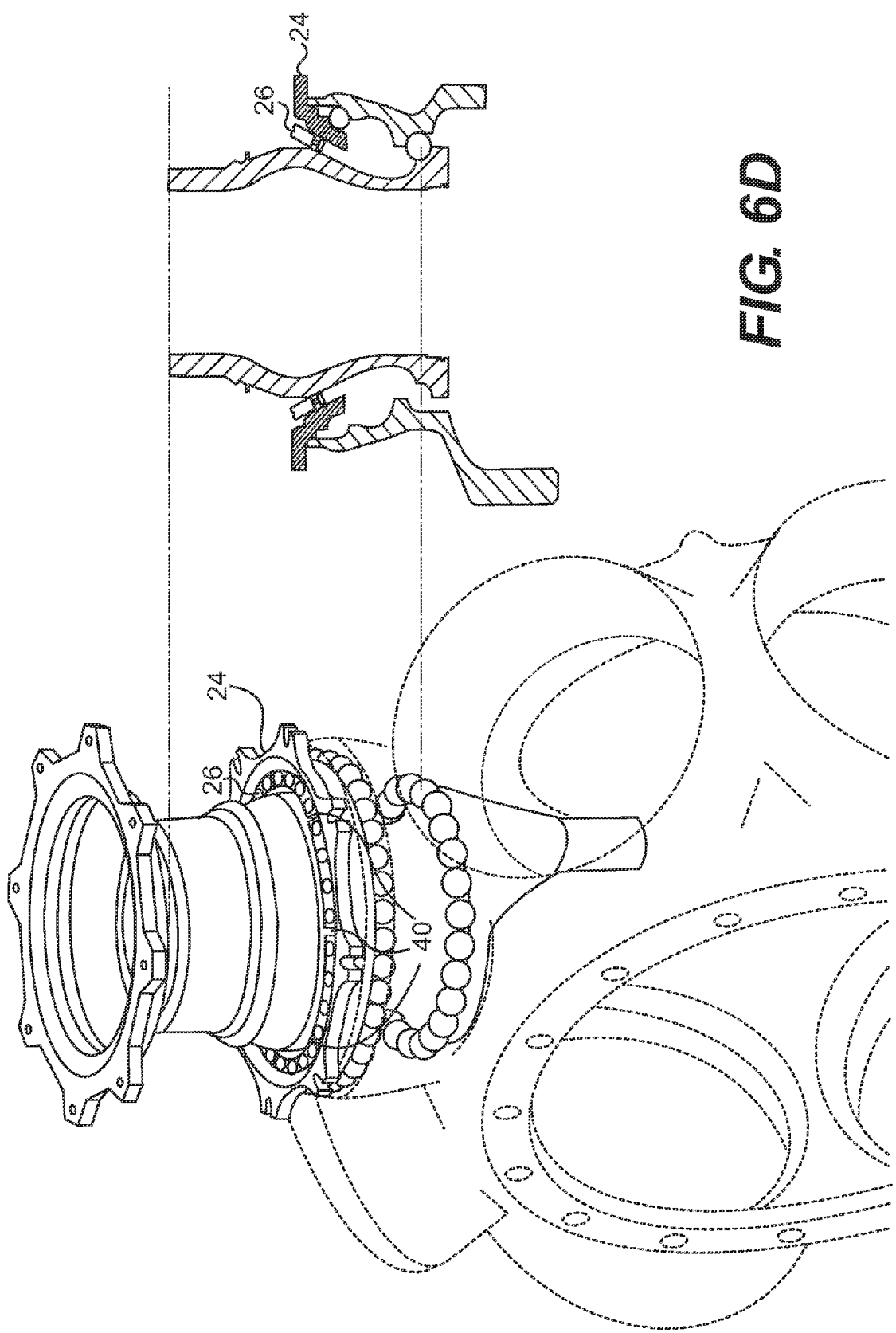
FIG. 6D is a perspective view illustrating a step of the assembly method of FIG. 5.
Figure 6F:
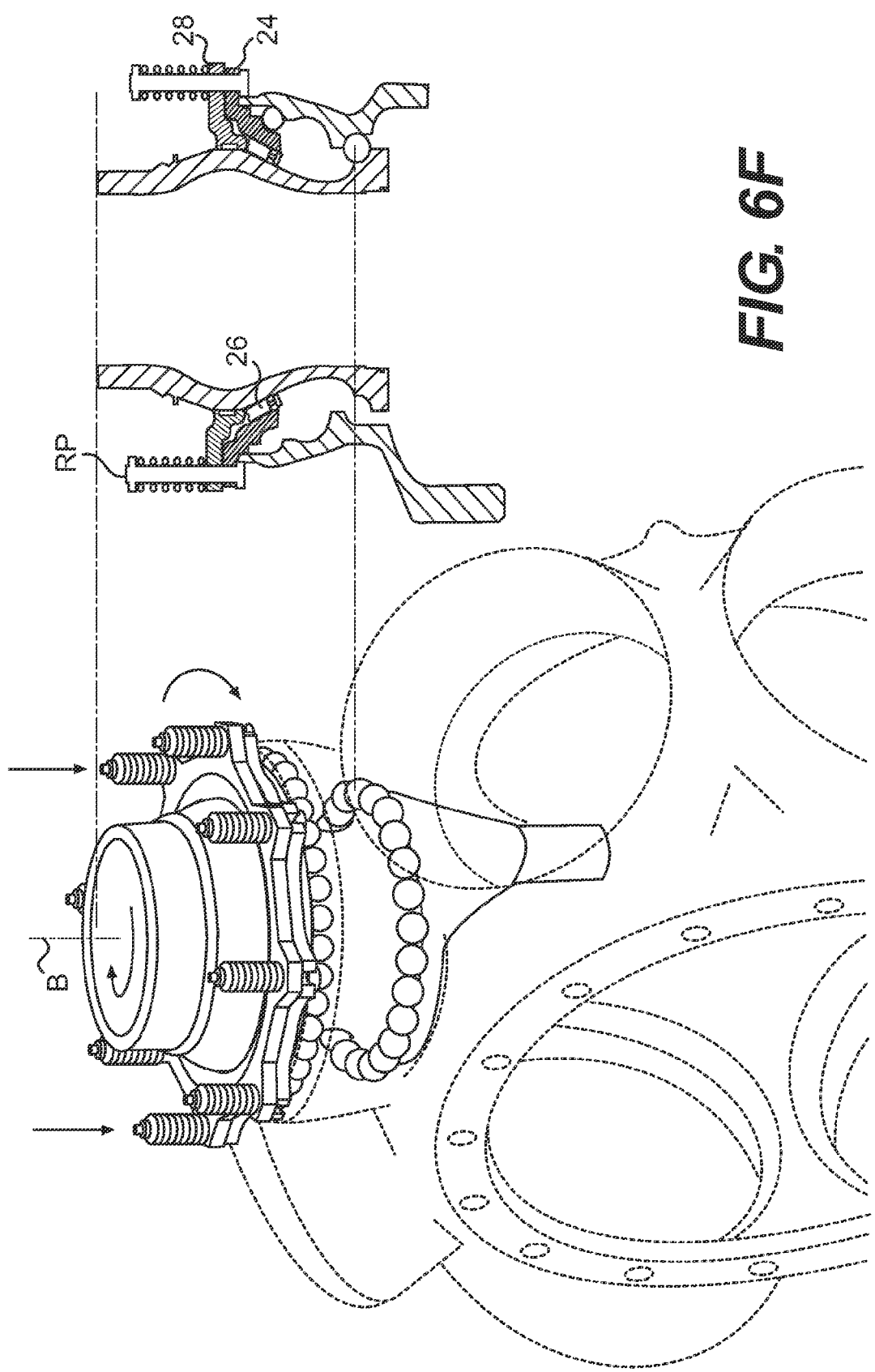
FIG. 6F is a perspective view illustrating a step of the assembly method of FIG. 5.

In step 150, the floating race 24 is lowered onto the outboard retaining bearing set 22 to complete the outer race 22R formed between the floating race 24 and the hub arm 16 (FIG. 6C).

In step 160, the tapered roller bearing set 26 is installed between the floating race 24 and the propeller blade root 18 (FIG. 6D). At this initial position, an equally spaced gap between each of the multiple of tapered roller bearing cartridge assemblies 40 is defined.

In step 170, the end cap 28 is lowered onto the tapered roller bearing set 26 until the end cap nose 32 contacts the tapered roller bearing set 26 (FIG. 6E). In step 180, preload springs S are mounted on bolts P which are passed through end cap apertures 28a and floating race apertures 24a.

The preload springs S bias the end cap 28 toward the floating race 24. A nut Rp threaded to the preload bolt P selectively retains the spring S on the preload bolt P. The nut Rp is then torqued to create a state of compression on the preload spring S. It should be understood that other preload devices and fixtures may alternatively be utilized to apply a preload which biases the tapered roller bearing elements 44 toward the floating race 24 during installation.

Figure 7:
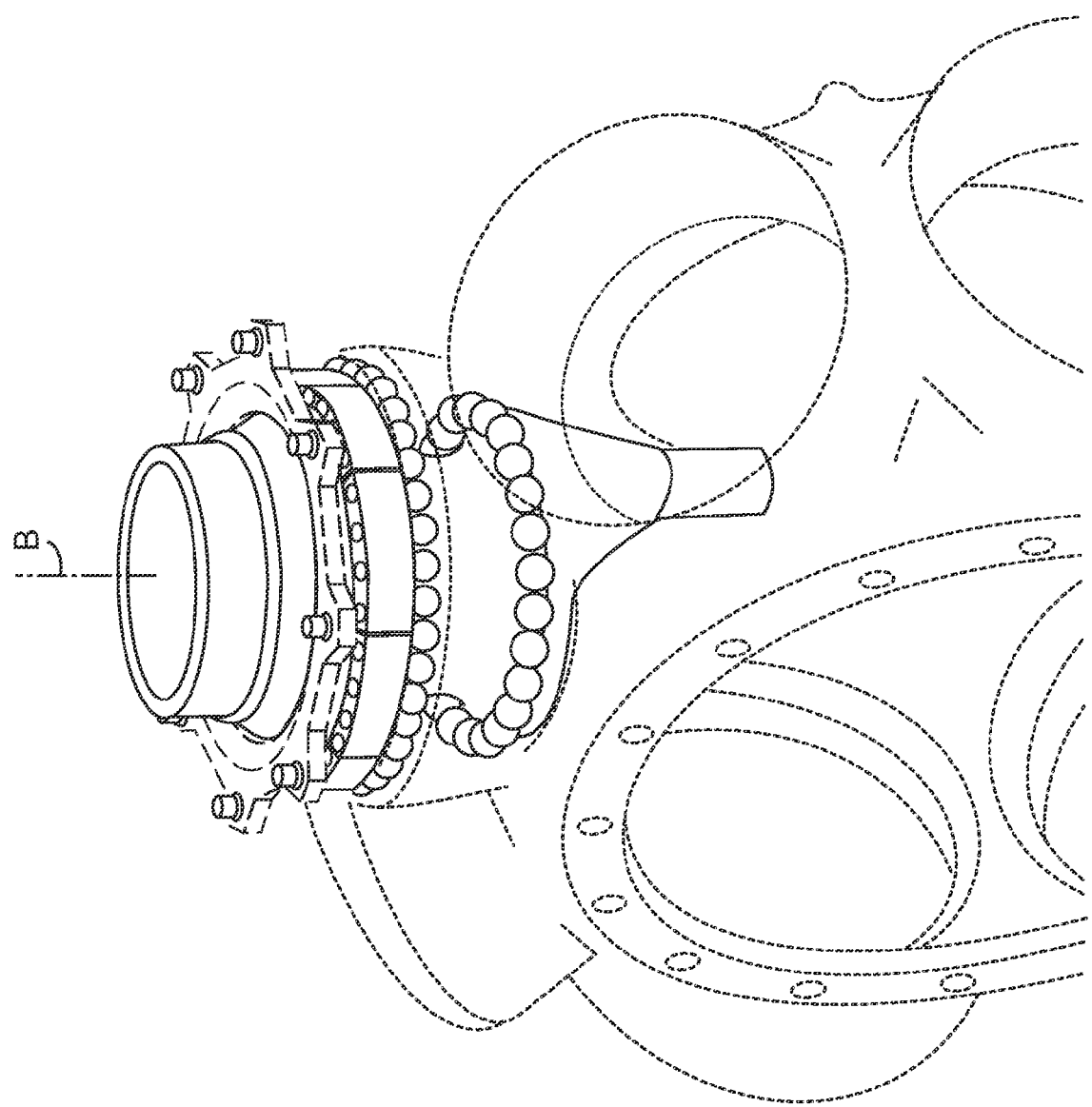
FIG. 7 is a partial phantom perspective view of the propeller blade retention system in an assembled condition.

In step 190, the floating race 24, end cap 28, and preload springs S are rotated until the tapered roller bearing set 26 is fully installed. The tapered roller bearing set 26 is fully seated when the end cap 28 mates in facial engagement with the floating race 24 (FIG. 6F). During this preload process, the gap between each of the multiple of tapered roller bearing cartridge assemblies 40 closes such that an essentially equal space between each tapered roller bearing elements 44 is provided about the circumference of the tapered roller bearing set 26 (FIG. 7). That is, the multiple of tapered roller bearing cartridge assemblies 40 facilitate installation and retention of the tapered roller bearing elements 44 within the preloaded propeller blade retention system as the multiple of tapered roller bearing cartridge assemblies 40 move together during the process of preloading the retention.

The preload condition is initially established by the preload springs S which apply a load on the end of the tapered roller elements 44 as the floating race 24 is rotated which allows the tapered roller bearing set 26 to progressively push the propeller blade root 18 outboard and the floating race 24 inboard along the axis B generating the preloaded condition. That is, the springs S maintain an axial roller end load as the roller bearing element progressively engage the conical space between the floating race 24 and the propeller blade root 18. This axial end load may alternatively or additionally be applied with tooling designed to interface with the outer race. Notably, the axial force is applied to the top of the tapered roller bearing elements 44. The axial force slides across the top of the roller during the preload process as a result of the hardware geometry.

The movement along the axis of the roller elements 44 is possible due to a combination of a low rolling coefficient of friction and a slightly tipped roller element 44 that processes inward in a helical path. The floating race 24 is important to the application of the preload as the propeller blade would not otherwise be free to rotate when engaged with the propeller pitch actuation system.

Once this process is completed, the tapered roller bearing set 26 is retained in place due to a relative high static coefficient of friction along the blade axis B. Notably, however, the propeller blade root 18 is still free to rotate about the blade axis B in response to pitch change inputs. The multiple of tapered roller bearing cartridge assemblies 40 move closer together during the process of preloading the retention because their final installed diameter, relative to the pitch change axis, is smaller in their final position than in their initial position.

In step 200, the nut Rp is removed from the bolt P and each preload spring S and bolt P are removed and replaced by the threaded fastener 30 (FIG. 7) into each of the end cap apertures 28a and floating race apertures 24a. It should be understood that each nut Rp, the bolt P and preload spring S may be removed individually prior to installation of the threaded fastener 30. The tapered roller bearing set 26 is alternatively retained in place due to a relative high static coefficient of friction along the blade axis B.

To disassemble the blade assembly 14 from the hub arm 16, the threaded fasteners 30 are removed. The axial load on the tapered roller bearing set 26 is then removed by rotation of the floating race 24 such that the normal forces on the tapered roller bearing set 26 from the preload and the tapered roller bearing element cone angle result in a self-generated axial load on the tapered roller bearing set 26 which pushes the tapered roller bearing set 26 out of engagement.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A tapered roller bearing cartridge assembly for a propeller blade retention assembly comprising:
    a retention cartridge having at least one roller bearing element slot which defines a roller bearing element axis, said at least one roller bearing element slot having a retention feature; and
    a tapered roller bearing element having a bearing element main body section, a reduced diameter bearing element section, and a bearing element shaft section therebetween, said bearing element shaft section engageable with said retention feature within each of said at least one roller bearing element slot.

2. The assembly as recited in claim 1, wherein said reduced diameter bearing element section is of a diameter less than said bearing element main body section.

3. The assembly as recited in claim 1, wherein said bearing element shaft section is of a diameter less than said reduced diameter bearing element section and said bearing element main body section.

4. The assembly as recited in claim 1, wherein said topmost roller bearing section extends beyond a topmost section of said retention cartridge.

5. The assembly as recited in claim 1, wherein said reduced diameter bearing element section defines a clearance within said roller bearing element slot.

6. The assembly as recited in claim 1, wherein said retention cartridge includes a break edge defined along each longitudinal edge of said at least one roller bearing element slot.

7. The assembly as recited in claim 1, wherein said at least one roller bearing element slot includes four roller bearing element slots.

8. The assembly as recited in claim 7, wherein each of said four roller bearing element slots are bridged by a retention feature.

9. The assembly as recited in claim 8, wherein each of said four roller bearing element slots are bridged by a floor.

10. A propeller blade retention assembly comprising:
    a propeller blade root which defines a blade axis;
    a hub arm which at least partially surrounds said propeller blade root;
    a floating race mounted generally between said hub arm and said propeller blade root, said floating race defines a floating race bearing surface and said propeller blade root defines a propeller blade root bearing surface, said floating race bearing surface and said propeller blade root bearing surface define a cone angle which intersects said blade axis, said floating race bearing surface and said propeller blade root bearing surface receives said multiple of tapered roller bearing cartridge assemblies therebetween;
    a tapered roller bearing set having a multiple of tapered roller bearing cartridge assemblies mounted between said floating race and said propeller blade root, each of said multiple of tapered roller bearing cartridge assemblies are in contact with an adjacent one of said multiple of tapered roller bearing cartridge assemblies under the pre-load; and
    an end cap mounted to said floating race to maintain pre-load in said propeller blade root relative to said hub arm.

11. The assembly as recited in claim 10, wherein each of said multiple of tapered roller bearing cartridge assemblies have at least one tapered roller bearing element.

12. A propeller blade retention assembly comprising:
    a propeller blade root which defines a blade axis;
    a hub arm which at least partially surrounds said propeller blade root;
    a floating race mounted generally between said hub arm and said propeller blade root, said floating race defines a floating race bearing surface and said propeller blade root defines a propeller blade root bearing surface, said floating race bearing surface and said propeller blade root bearing surface define a cone angle which intersects said blade axis, said floating race bearing surface and said propeller blade root bearing surface receives said multiple of tapered roller bearing cartridge assemblies therebetween;
    a tapered roller bearing set having a multiple of tapered roller bearing cartridge assemblies mounted between said floating race and said propeller blade root, each of said multiple of tapered roller bearing cartridge assemblies have at least one tapered roller bearing element, each of said multiple of tapered roller bearing elements have a bearing element main body section, a reduced diameter bearing element section, and a bearing element shaft section therebetween; and
    an end cap mounted to said floating race to maintain pre-load in said propeller blade root relative to said hub arm.

13. The assembly as recited in claim 12, wherein said bearing element shaft section is engageable with a retention feature within a retention cartridge of each of said multiple of tapered roller bearing cartridge assemblies.

14. A method of assembling a propeller blade retention assembly comprising the steps of:
    (1) locating a propeller blade foot into a hub arm along a blade axis;
    (2) locating a floating race in contact with an outboard retaining ball bearing set within the hub arm;
    (3) locating a tapered roller bearing set between the floating race and the propeller blade root, the tapered roller bearing set having a multiple of tapered roller bearing cartridge assemblies such that each of said multiple of tapered roller bearing cartridge assemblies are separated from an adjacent one of said multiple of tapered roller bearing cartridge assemblies; and
    (4) locating an end cap into facial engagement with the floating race, the end cap contacting the tapered roller bearing set to maintain pre-load of the propeller blade root relative the hub arm such that each of said multiple of tapered roller bearing cartridge assemblies define a clearance between an adjacent one of said multiple of tapered roller bearing cartridge assemblies under the pre-load.

15. A method as recited in claim 14, wherein said step (4) further comprises:
(a) rotating the floating race and the end cap until the end cap contacts the floating race in the facial engagement.

16. A method as recited in claim 15, wherein said step (a) further comprises:
(i) rotating the floating race and the end cap until the tapered roller bearing set is fully seated between the floating race and the propeller blade root.

* * * * *